Oct. 18, 1938.  D. F. SEARLE  2,133,580
AIR BRAKE SYSTEM
Filed July 19, 1937
FIG. 1.
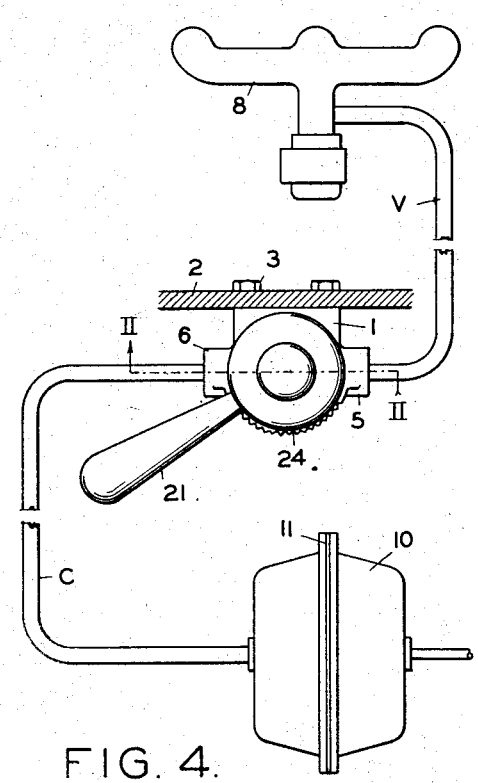
FIG. 2.
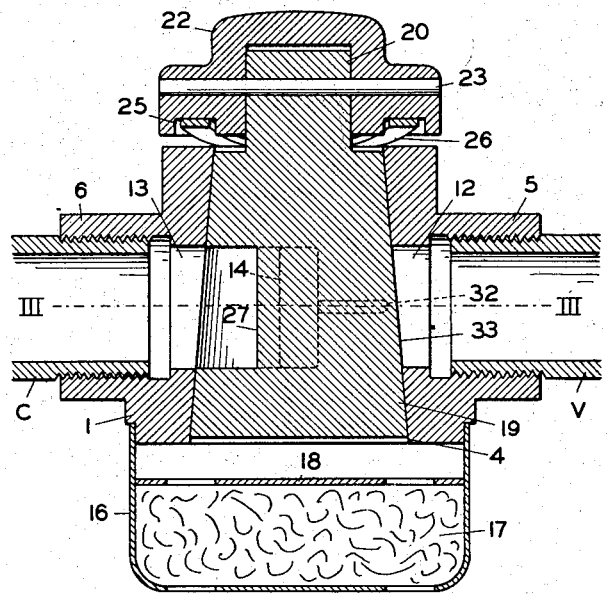
FIG. 3.
FIG. 4.
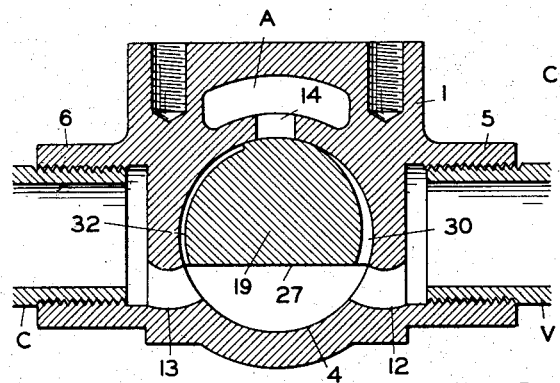
FIG. 5.
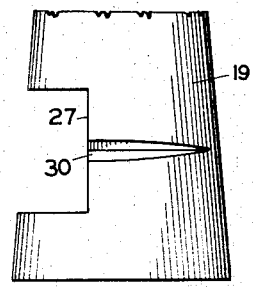
INVENTOR:
DUDLEY F. SEARLE
BY Baldwin Vale
ATTORNEY Patented Oct. 18, 1938

2,133,580

UNITED STATES PATENT OFFICE 2,133,580

AIR BRAKE SYSTEM

Dudley F. Searle, Oakland, Calif.

Application July 19, 1937, Serial No. 154,469

5 Claims. (Cl. 303—50)

This invention relates to improvements in air brake systems, and more particularly to graduating control valves therefor.

Among the objects of this invention is to provide a control valve which will automatically maintain the brake power chamber at a constant pressure so that the brakes can be held applied to any desired extent without variation for a prolonged period.

Another object is to render the control valve capable of maintaining various pressures in the brake chamber which are accurately proportional to the distance that the control valve is moved from neutral position.

Another object is to provide a graduating control valve which will automatically maintain any desired pressure throughout the range from zero pressure to the maximum pressure obtainable.

Another object is to provide unrestricted communication between the brake chamber and the pressure source for emergency operation of the brakes.

Another object is to provide a valve of simple construction, inexpensive of manufacture, and permanently reliable in operation.

In prior valves of the present type, tapered grooves were provided which cooperated with both the pressure supply port and the atmospheric port. The brake chamber port was thus in communication with both the atmosphere and the source of pressure to a variable extent. The existence of two variable quantities rendered it difficult to design prior valves so that the pressure maintained in the brake chamber would be accurately proportional to the extent of the movement of the control valve. It has been found, in practice, in the case of sub-atmospheric pressure brakes for motor vehicles, that under this teaching of the prior art, it is impossible to maintain a brake cylinder pressure in the range between eight and twenty inches of vacuum.

Broadly stated, the present invention consists, in part, of providing a tapered channel for cooperating with the pressure port of a control valve, and a groove of constant cross-sectional area for cooperating with the atmospheric port.

Other objects and advantages appear as this description progresses.

In the specification and the accompanying drawing, the invention is disclosed in its preferred form. It is, however, to be understood that the invention is not limited to this form because modifications may be made within the purview of the claims following the description.

In the one sheet of drawings:

Fig. 1 is a diagrammatic view of a control valve constructed in accordance with this invention shown in plan view connected to the essential elements of a conventional vacuum air brake system which is shown in side elevation.

Fig. 2 is an enlarged vertical section taken along the line II—II in Fig. 1 of the control valve.

Fig. 3 is a horizontal section taken along the line III—III in Fig. 2 and showing the valve in an operating position.

Fig. 4 is a similar view of the same in the position for full application of the brakes.

Fig. 5 is a detail view in side elevation of the valve plug showing the tapered pressure control groove.

In detail, the construction illustrated in the drawing comprises the valve body 1 secured to a suitable support 2 by the screws 3 as in Fig. 1. It has the central opening 4 therethrough which tapers toward its upper end. The bosses 5 and 6 extend from opposite sides of the valve body and are internally threaded.

The pipe V is screwed into the boss 5 and leads to a source of sub-atmospheric air pressure such as the intake motor manifold 8 of an internal combustion motor. The pipe C is similarly connected to the boss 6 and communicates with the brake power chamber 10 having the usual diaphragm 11 therein. The ports 12 and 13 provide communication between the central opening 4 and the pipes V and C respectively. The ports intersect the opening 4 at substantially 120 degrees from each other.

The port 14 is provided in the opposite side of the opening 4 substantially equidistant from the ports 12 and 13. It communicates with the passage A which leads to the atmosphere through the bottom of the body 1. An air cleaner is provided for the air entering the passage 15. It consists of the perforated cup 16 secured to the bottom of the valve body and containing the fibrous filtering material 17. The perforated disk 18 retains the material 17 in place within the cup 16.

The tapered valve plug 19 is a smooth sliding fit within the opening 4. It has the stem 20 projecting upwardly therefrom. The manual operating handle 21 has its hub 22 fixed on the stem 20 by means of the transverse pin 23. The handle 21 may have a conventional friction pawl (not shown) cooperating with the notches 24, provided on the body 1, see Fig. 1, to retain the handle in the position to which it is moved by the operator.

The bottom of the hub 22 has the annular groove 25 therein. The marcel spring 26 confined in this groove expands against the top of the body 1 and draws the tapered plug 19 into firm engagement with the walls of the opening 4.

The plug 19 has the chordal recess 27 therein which is substantially of the same cross sectional area as the ports 12, 13, and 14. When the valve is in neutral position, the recess 27 registers with the ports 13 and 14 which communicate with the chamber 10 and the atmosphere respectively. The channel 30 in the side of the plug 19 extends from the recess 27 in a counterclockwise direction and diminishes in both width and depth until it vanishes at a point near the passage 12, see Figs. 3 and 5. The groove 32 is of uniform width and depth and extends from the slot 27 in a clockwise direction and cooperates with the passage 14, see Fig. 3.

The apparatus operates substantially as follows: When the valve is in neutral position as shown in Fig. 2, the chamber 10 is maintained at atmospheric pressure by air being free to flow from the atmospheric duct A, through the recess 27 registering with the ports 13 and 14, into the pipe C leading to the chamber.

To apply the brakes the handle 21 is manually moved to the right a distance depending upon the extent of brake application desired. This rotates the plug 19 in a counterclockwise direction. The recess 27 passes out of registry with the port 14. The port 14, however, remains in communication with the port 13 through the restricted groove 32. The end of the channel 30 moves into registry with the port 12.

Air flows at a limited rate from the port 13, past the restriction at 30 into the intake manifold 8. The reduced pressure in the recess 27 causes air to flow thereinto from the atmosphere through the tapered channel 32. The recess 27 then reaches an equilibrium pressure which depends upon the relative sizes of the air passages afforded to the manifold 8, past the restriction 30, and from the atmosphere over the tapered channel 32. The pressure in the power chamber 10 falls until it equals the equilibrium pressure in the recess 27. It then remains constant. The brakes are thus applied and held applied to a constant extent.

This equilibrium pressure may be raised or lowered by moving the handle 21 to the right or left respectively. This rotates the tapered channel 30 with respect to the port 12 thus either increasing or decreasing the size of the air passage therethrough with respect to the constant size of the opening through the groove 32. The groove 32 of constant cross sectional area throughout renders it possible to arrange the dimensions of the single tapered slot 30 to provide for accurate control of the brakes throughout the full range of operating pressures desired.

To apply the brakes fully, the handle 21 is moved to the extreme right. This moves the plug 19 into the position shown in Fig. 4 with the recess 27 registering with both the port 13 and the port 12. The groove 32 passes out of registry with the port 14. This cuts off the power chamber 10 from communication with the atmosphere. The recess 27 provides unrestricted communication between the power chamber 10 and the manifold 8. The pressure in the chamber 10 immediately falls to the subatmospheric pressure in the manifold, rapidly applying the brakes to their fullest extent as required in emergency operation.

The brakes are released by simply moving the handle 21 to the extreme left. The plug 19 then assumes the position shown in Fig. 2. The portion 33 covers the port 12 thus closing off all communication to the intake manifold 8. Free communication from the atmosphere to the chamber 10 is provided by the recess 27. This fully releases the brakes with rapidity.

It will be obvious to those skilled in the art that the tapered channel 30 and the groove 32 of constant cross sectional areas could be transposed without affecting the operation of the valve.

Having thus described the invention, what is claimed and desired to be secured by Letters Patent is:

1. In an air brake system having a source of pressure and a power chamber therein; a control valve body having three ports therein leading to said pressure source, said chamber, and the atmosphere respectively; and a movable valve member adapted to cooperate with said ports and having a neutral and intermediate and extreme operative positions, said valve member having a recess therein adapted to provide unrestricted communication between the power chamber port and the atmospheric port respectively when said valve member is in said neutral position, said valve member having a greatly restricted groove therein adapted to provide communication between said atmospheric and said chamber port when said valve member is in an intermediate operative position and a second restricted groove arranged to be out of registry with said pressure port when said valve member is in the neutral position but being brought into registry therewith when said valve member is moved to an intermediate operative position, said valve member being arranged to bring the recess into a position to provide unrestricted communication between said pressure source port and said chamber port when said valve member is in the extreme operative position.

2. In an air brake system having a source of sub-atmospheric pressure and a power chamber therein; a control valve body having three ports therein connected to said pressure source, said chamber, and the atmosphere respectively; and a movable valve member adapted to cooperate with said ports and having neutral and operative positions, said valve member having a recess therein adapted to provide unrestricted communication between said atmospheric and chamber ports when said valve member is in said neutral position, said valve member having a restricted groove therein of constant cross sectional area and adapted to provide communication between said atmospheric port and said chamber port respectively when said valve member is moved out of said neutral position, said valve member also having a tapered channel therein arranged so as to be out of registry with said pressure port when said valve member is in the neutral position and adapted to provide progressively less restricted communication between said pressure source port and said chamber port when said valve member is moved from neutral position.

3. In an air brake system having a source of subatmospheric pressure and a power chamber therein; a control valve body having three ports therein connected to said pressure source, said chamber, and the atmosphere respectively; a valve member adapted to cooperate with said ports and having a neutral and an extreme operative position; said valve member havig a recess therein adapted to provide unrestricted communication between said atmospheric and chamber ports when said valve member is in said neutral position, said valve member having a restricted groove therein of constant cross sectional area adapted to provide communication between said atmospheric and chamber ports respectively when said valve member is moved out of said neutral position, said valve member also having a tapered channel arranged so as to be out of registry with said pressure port when said valve member is in said neutral position and adapted to provide communication between said pressure port and said chamber port when said valve member is in positions intermediate said neutral and said extreme operative position, said larger recess being arranged to provide unrestricted communication between said pressure source port and said chamber port when said valve member is in said extreme operative position.

4. In an air brake system having a source of pressure and a power chamber therein; a control valve body having three ports therein leading to said pressure source, said chamber, and the atmosphere respectively; and a movable valve member adapted to cooperate with said ports and having neutral and operative positions, said valve member being arranged to provide communication between said atmospheric and chamber ports when said valve member is in said neutral position, said valve member having a restricted groove therein adapted to provide communication between said atmospheric port and said chamber port respectively when said valve member is moved into an operative position, said valve member also having a channel therein tapered in both width and depth arranged so as to be out of registry with said pressure port when said valve member is in the neutral position and adapted to be brought into registry with said pressure source port when said valve member is in an operative position.

5. In air air brake system having a source of sub-atmospheric pressure and a power chamber therein; a control valve body having an opening therein with three ports intersecting said opening and connected to said pressure source, said chamber, and the atmosphere respectively; and a plug member rotatable within said opening and having a neutral and a variable operative position, said plug member having a restricted groove therein of constant cross sectional area adapted to provide communication between the ports connected with the atmosphere and said chamber respectively when said plug member is rotated out of said neutral position, said plug member having a larger recess therein adapted to provide communication between said atmospheric and said chamber ports when said plug member is in the neutral position, said plug member also having a tapered channel arranged so as to be out of registry with said pressure port when said plug member is in the neutral position and adapted to provide progressively greater communication between said pressure source port and said chamber port the farther said plug member is rotated from said neutral position.

DUDLEY F. SEARLE.